United States Patent
Jeong et al.

(10) Patent No.: US 10,911,136 B2
(45) Date of Patent: Feb. 2, 2021

(54) COMMUNICATION METHOD AND COMMUNICATION DEVICE USING AMBIENT BACKSCATTER COMMUNICATION

(71) Applicants: Electronics and Telecommunications Research Institute, Daejeon (KR); FOUNDATION FOR RESEARCH AND BUSINESS, SEOUL NATIONAL UNIVERSITY OF SCIENCE AND TECHNOLOGY, Seoul (KR)

(72) Inventors: Byung Jang Jeong, Seoul (KR); Woo Jin Byun, Daejeon (KR); Ji-Hoon Yun, Seoul (KR); Jae-Han Lim, Seoul (KR); Wisnu Murti, Seoul (KR)

(73) Assignees: Electronics and Telecommunications Research institute, Daejeon (KR); FOUNDATION FOR RESEARCH AND BUSINESS, SEOUL NATIONAL UNIVERSITY OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/203,394

(22) Filed: Nov. 28, 2018

(65) Prior Publication Data
US 2019/0253135 A1    Aug. 15, 2019

(30) Foreign Application Priority Data
Feb. 12, 2018    (KR) .................. 10-2018-0017253

(51) Int. Cl.
*H04B 7/22*    (2006.01)
*H04B 7/0456*    (2017.01)
(Continued)

(52) U.S. Cl.
CPC ............. *H04B 7/22* (2013.01); *H04B 1/006* (2013.01); *H04B 7/0473* (2013.01); *H04B 7/0805* (2013.01); *H04L 1/0003* (2013.01)

(58) Field of Classification Search
CPC ...... H04B 1/005; H04B 1/006; H04B 1/0067; H04B 1/02; H04B 1/034; H04B 1/04;
(Continued)

(56) References Cited

U.S. PATENT DOCUMENTS 5,333,126 A * 7/1994 Fukuda .............. G11B 7/0045
                                                       360/48
9,103,887 B2 * 8/2015 Rivoir .............. G01R 31/31937
(Continued)

FOREIGN PATENT DOCUMENTS

| KR | 101590291 B1 | 2/2016 |
| KR | 101668559 B1 | 10/2016 |
| KR | 101733340 B1 | 5/2017 |

OTHER PUBLICATIONS

Murti et al., "Multi-Leveling for Higher Capacity of Wi-Fi Backscatter Communications", ICT Convergence Technologies Leading the Fourth Industrial Revolution, Oct. 18, 2017, ICTC 2017, Jeju, Republic of Korea.

(Continued)

*Primary Examiner* — Young T. Tse
(74) *Attorney, Agent, or Firm* — William Park & Associates Ltd.

(57) ABSTRACT

Disclosed are a communication method and communication apparatus using an ambient backscatter communication. A transmission apparatus may include generating a plurality of bitsets by fragmenting data based on a predetermined bitset length, mapping the plurality of bitsets to a plurality of switching patterns based on a data size, and controlling a reflection of a background radio frequency (RF) signal based on a corresponding mapped switching pattern, a total num- (Continued)

ber of the plurality of switching patterns may be determined based on the bitset length, and each of the plurality of switching patterns may have a different length.

10 Claims, 7 Drawing Sheets

(51) Int. Cl.
   *H04L 1/00* (2006.01)
   *H04B 1/00* (2006.01)
   *H04B 7/08* (2006.01)

(58) Field of Classification Search
   CPC ........ H04B 7/028; H04B 7/0473; H04B 7/06;
              H04B 7/0602; H04B 7/0805; H04B 7/22;
              H04L 1/0003; H04L 1/0033
   USPC .......... 375/218, 259, 260, 295; 455/92, 106,
                                                   455/118
   See application file for complete search history.

(56) References Cited

U.S. PATENT DOCUMENTS

| | | | |
|---|---|---|---|
| 9,419,838 B1* | 8/2016 | Wentzloff | ............ H04L 5/0044 |
| 2007/0069852 A1 | 3/2007 | Mo et al. | |
| 2008/0052015 A1* | 2/2008 | Ozawa | ............ G01R 31/31932 |
| | | | 702/57 |
| 2011/0006884 A1 | 1/2011 | Park et al. | |
| 2016/0171077 A1* | 6/2016 | Ros-Giralt | ........ G06F 16/90344 |
| | | | 707/755 |
| 2017/0313331 A1* | 11/2017 | Hilleary | ................ B61L 25/021 |
| 2018/0124704 A1* | 5/2018 | Jung | ................. H04W 52/0229 |

OTHER PUBLICATIONS

Kellogg et al., Wi-Fi Backscatter: Internet Connectivity for RF-Powered Devices, Aug. 2014, University of Washington, USA.
Liu et al., Ambient Backscatter: Wireless Communication Out of Thin Air, Aug. 2013, University of Washington, USA.

\* cited by examiner

COMMUNICATION METHOD AND COMMUNICATION DEVICE USING AMBIENT BACKSCATTER COMMUNICATION

CROSS-REFERENCE TO RELATED APPLICATION(S)

This application claims the priority benefit of Korean Patent Application No. 10-2018-0017253 filed on Feb. 12, 2018, in the Korean Intellectual Property Office, the disclosure of which is incorporated herein by reference for all purposes.

BACKGROUND

1. Field

One or more example embodiments relate to a communication method and communication device using an ambient backscatter communication.

2. Description of Related Art

As a part of ultra-low power communication, a large number of researchers have studied ambient backscatter communication technology that enables the transmitting or receiving of information using energy collected from a background radio frequency (RF) signal. According to research on ambient backscatter communication between devices using a background RF signal of an ultra-high frequency (UHF) television (TV) band, a smartphone, which is most commonly used as an Internet gateway, may not receive an RF signal of the UHF TV band. Thus, supplementary research on an ambient backscatter communication technology using a wireless-fidelity (Wi-Fi) background RF signal is also ongoing.

In general, the ambient backscatter communication distinguishes received signals by simultaneously using two technologies. The first technology performs signal smoothing on fluctuation by a background RF signal by averaging received signals during a predetermined amount of time. The second technology distinguishes bit information of the received signals by comparing an average of the received signals and a threshold value.

SUMMARY

According to an aspect of at least one example embodiment, there is provided a transmission method including generating a plurality of bitsets by fragmenting data based on a predetermined bitset length, mapping the plurality of bitsets to a plurality of switching patterns based on a data size, and controlling a reflection of a background radio frequency (RF) signal based on a corresponding mapped switching pattern. A total number of the plurality of switching patterns is determined based on the bitset length, and each of the plurality of switching patterns has a different length.

The controlling of the reflection may include reflecting the background RF signal by switching an RF switch based on the corresponding mapped switching pattern.

The total number of the plurality of switching patterns may be $2^n$, and the n may be the bitset length.

The mapping of the plurality of bitsets to the plurality of switching patterns may include mapping a first bitset among the plurality of bitsets to a first switching pattern, and mapping a second bitset among the plurality of bitsets to a second switching pattern. Each of the first switching pattern and the second switching pattern may have a different length.

According to another aspect of at least one example embodiment, there is provided a transmission apparatus including a controller configured to generate a plurality of bitsets by fragmenting data based on a predetermined bitset length, map the plurality of bitsets to a plurality of switching patterns based on a data size, and control a reflection of a background RF signal based on a corresponding mapped switching pattern, and an RF switch configured to reflect the background RF signal under control of the controller. A total number of the plurality of switching patterns is determined based on the bitset length, and each of the plurality of switching patterns has a different length.

The background RF signal may be configured as a wireless-fidelity (Wi-Fi) signal.

The total number of the plurality of switching patterns may be $2^n$, and the n may be the bitset length.

The controller may be configured to map a first bitset among the plurality of bitsets to a first switching pattern and map a second bitset among the plurality of bitsets to a second switching pattern, and each of the first switching pattern and the second switching pattern may have a different length.

According to another aspect of at least one example embodiment, there is provided a reception method including receiving a background RF signal, acquiring an average signal based on a carrier frame unit by performing an average on the background RF signal, acquiring an intensity of the average signal, and acquiring a plurality of bitsets by comparing the intensity to a multi-threshold point.

A number of multi-threshold points may be determined based on a bitset length of the plurality of bitsets.

The number of multi-threshold points may be $2^n$, and the n may be the bitset length.

The background RF signal may be configured as a Wi-Fi signal.

According to another aspect of at least one example embodiment, there is provided a reception apparatus including an antenna configured to receive a background RF signal and a controller configured to acquire an average signal based on a carrier frame unit by performing an average on the RF signal, acquire an intensity of the average signal, and acquire a plurality of bitsets by comparing the intensity to a multi-threshold point.

The controller may determine a number of multi-threshold points based on a bitset length of the plurality of bitsets.

The number of multi-threshold points may be $2^n$, and the n may be the bitset length.

The RF signal may be configured as a Wi-Fi signal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1A:
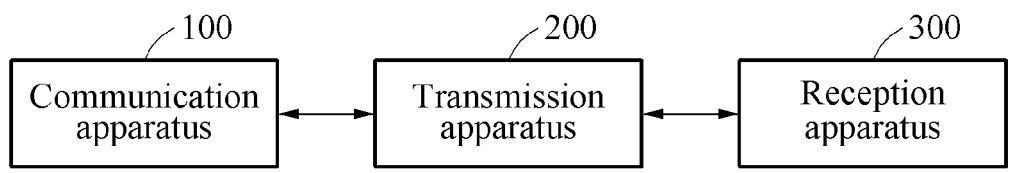
FIG. 1A is a diagram illustrating a communication system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, the following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms used herein are used only to explain the example embodiments, not to limit the same. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein. Also, in the description of embodiments, detailed description of well-known related structures or functions will be omitted when it is deemed that such description will cause ambiguous interpretation of the present disclosure.

Figure 1B:
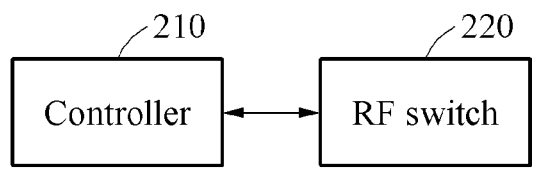
FIG. 1B is a diagram illustrating a transmission apparatus of FIG. 1A.
Figure 1C:
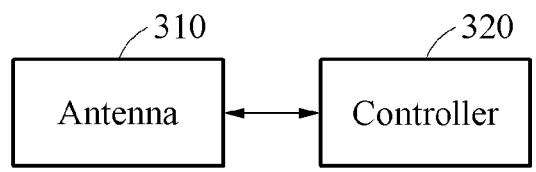
FIG. 1C is a diagram illustrating a reception apparatus of FIG. 1A.
Figure 2:
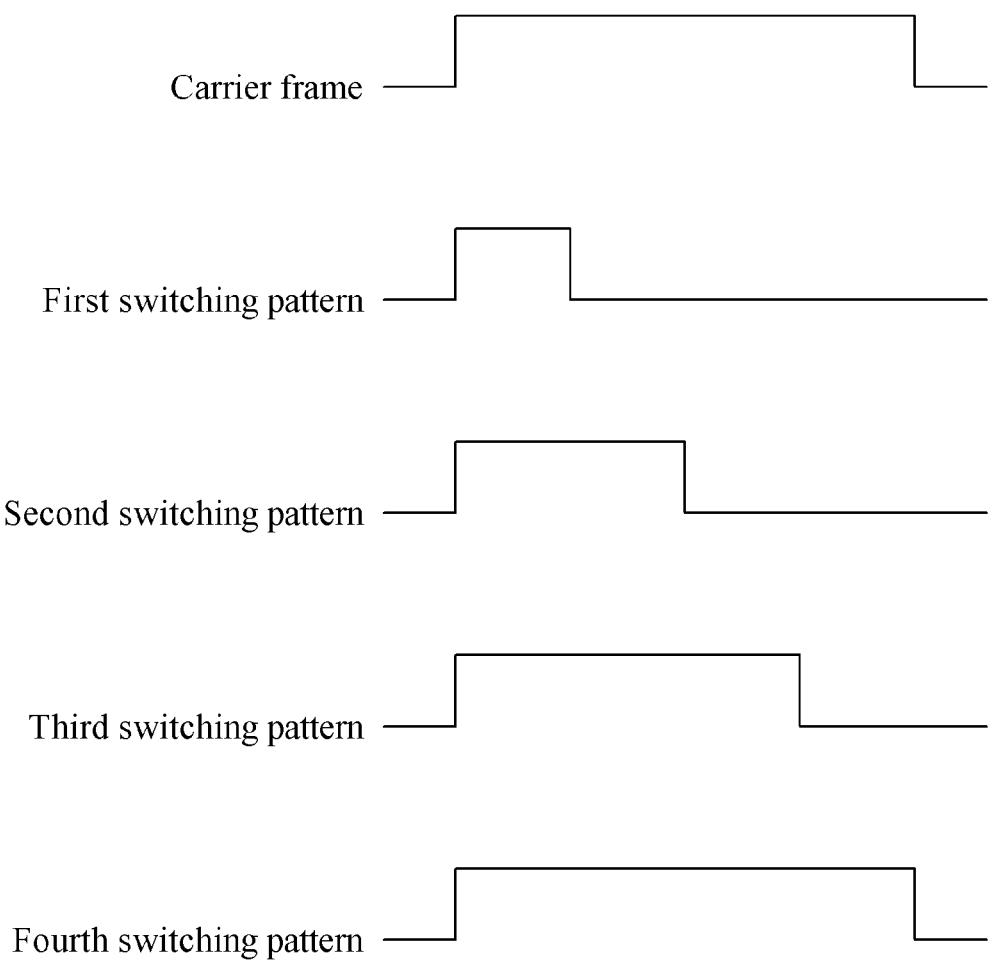
FIG. 2 illustrates an example of describing an operation of a transmission apparatus according to an example embodiment.
Figure 3:
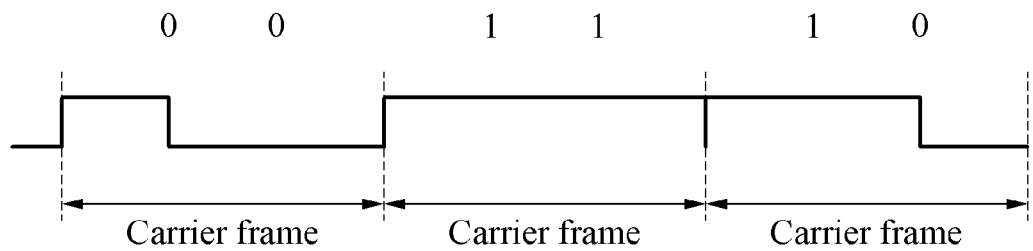
FIG. 3 illustrates an example of describing an operation of a transmission apparatus according to an example embodiment.
Figure 4:
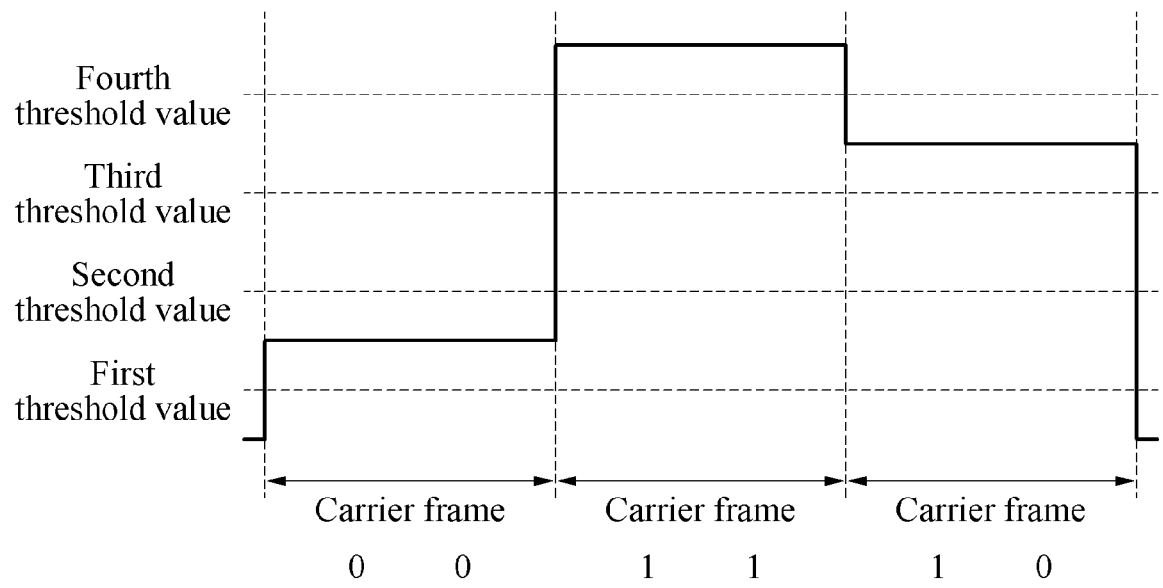
FIG. 4 illustrates an example of describing an operation of a reception apparatus according to an example embodiment.

FIG. 1A is a diagram illustrating a communication system according to an example embodiment, FIG. 1B is a diagram illustrating a transmission apparatus of FIG. 1A, FIG. 1C is a diagram illustrating a reception apparatus of FIG. 1A, FIG. 2 illustrates an example of a switching pattern to describe an operation of a transmission apparatus according to an example embodiment, FIG. 3 illustrates an example of a carrier frame to describe an operation of a transmission apparatus according to an example embodiment, and FIG. 4 illustrates an example of a carrier frame to describe an operation of a reception apparatus according to an example embodiment.

Referring to FIG. 1A through 1C, a communication system 10 may be an ambient backscatter communication system using an ambient backscatter communication. The ambient backscatter communication may refer to a technology that supplies a minimum power for a circuit operation from a background radio frequency (RF) signal and transmits data by reflecting or absorbing the background RF signal.

The communication system 10 may include a communication apparatus 100, a transmission apparatus 200, and a reception apparatus 300.

The communication apparatus 100 may transmit a background RF signal to the transmission apparatus 200 and the reception apparatus 300. The transmission apparatus 200 and the reception apparatus 300 may communicate with each other using the background RF signal. The background RF signal may be configured as a wireless-fidelity (Wi-Fi) signal. That is, the communication apparatus 100 may be a router.

The transmission apparatus 200 may be a small device for implementing the Internet of things (IoTs) and may transmit data to the reception apparatus 300. Here, the transmission apparatus 200 may transmit the data using the background RF signal.

The transmission apparatus 200 may reflect or absorb the background RF signal of the communication apparatus 100. The transmission apparatus 200 may be provided between the communication apparatus 100 and the reception apparatus 300 and may efficiently reflect the background RF signal.

The transmission apparatus 200 may include a controller 210 and an RF switch 220.

The controller 210 may generate a plurality of bitsets by fragmenting data based on a predetermined bitset length.

For example, the bitset length may be 2 bits. The controller 210 may fragment data to be transmitted based on a unit of 2 bits. That is, when the data to be transmitted is $001110_{(2)}$, the controller 210 may generate bitsets including 00, 11, and 10 by fragmenting the data to be transmitted.

The controller 210 may map the plurality of bitsets to a plurality of switching patterns. For example, the controller 210 may map the bitsets including 00, 11, and 10 to the plurality of switching patterns. If the bitset length is 2 bits, the plurality of switching patterns may be provided as shown in FIG. 2.

A total number of the plurality of switching patterns may be determined based on the bitset length. For example, the total number of the plurality of switching patterns may be $2^n$, and n may be the bitset length. That is, if the bitset length is 2 bits, the total number of the plurality of switching patterns may be 4.

Also, each of the plurality of switching patterns may have a different length. A length of each of the plurality of switching patterns may be determined based on a length of a carrier frame of the background RF signal. For example, the controller 210 may determine the length of each of the plurality of switching patterns according to Equation 1.

$$l_k = k * \frac{T}{n} \qquad \text{[Equation 1]}$$

In Equation 1, $l_k$ denotes a length of a $k^{th}$ switching pattern among the plurality of switching patterns, T denotes a length of a carrier frame of the background RF signal, and n denotes the total number of the plurality of switching patterns.

The controller 210 may perform mapping based on a data size. Hereinafter, the data size may also be a bitset size. The controller 210 may map 00 to a first switching pattern, map 01 to a second switching pattern, map 10 to a third switching pattern, and map 11 to a fourth switching pattern.

That is, the controller 210 may transmit the data of $001110_{(2)}$ by controlling the RF switch 220 by sequentially using the first switching pattern, the fourth switching pattern, and the third switching pattern as shown in FIG. 3.

The RF switch 220 may reflect or adsorb the background RF signal in response to a control of the controller 210. For example, when the switching pattern is ON, the RF switch may reflect the background RF signal. When the switching pattern is OFF, the RF switch 220 may absorb the background RF signal. That is, the RF switch 220 may adjust a duty ratio based on the switching pattern.

The reception apparatus 300 may receive the background RF signal and decode the background RF signal to acquire the plurality of bitsets. The reception apparatus 300 may include an antenna 310 and a controller 320.

The antenna 310 may receive the background RF signal from the communication apparatus 100 and the transmission apparatus 200.

The controller 320 may perform an average on the background RF signal and acquire an average signal based on a carrier frame unit. Thus, the controller 320 may reduce an error that occurs due to an fluctuation of the background RF signal through averaging.

The controller 320 may acquire an intensity of the average signal and acquire the plurality of bitsets by comparing the intensity of the average signal to a multi-threshold point. A number of multi-threshold points may be determined based on the bitset length of the plurality of bitsets. That is, the transmission apparatus 200 and the reception apparatus 300 may share the bitset length with each other.

For example, the number of multi-threshold points may be $2^n$, and n may be the bitset length. Referring to FIGS. 2 through 4, since the bitset length is 2 bits, the number of multi-threshold points may be 4.

FIG. 4 illustrates an example of a configuration in which the controller 320 acquires the plurality of bitsets from the multi-threshold points.

The controller 320 may perform decoding by comparing the intensity of the average signal to the multi-threshold point based on the carrier frame unit.

The controller 320 may output 00 if the intensity of the average signal is greater than or equal to a first threshold value and less than a second threshold value. The controller 320 may output 01 if the intensity of the average signal is greater than or equal to the second threshold value and less than a third threshold value. The controller 320 may output 10 if the intensity of the average signal is greater than or equal to the third threshold value and less than a fourth threshold value. The controller 320 may output 11 if the intensity of the average signal is greater than or equal to the fourth threshold value.

Thus, the controller 320 may output $001110_{(2)}$ from the intensity of the average signal as shown in FIG. 4.

For convenience of description, the example embodiments are described in FIGS. 1A through 4 based on an example in which the bitset length is 2 bits, however, not limited thereto and may be performed by variously modifying the bitset length. Also, the example embodiments may be performed by variously modifying the total number of the plurality of switching patterns.

Hereinafter, an example in which a bitset length is predetermined as 3 bits is described with reference to FIGS. 5 through 7.

Figure 5:
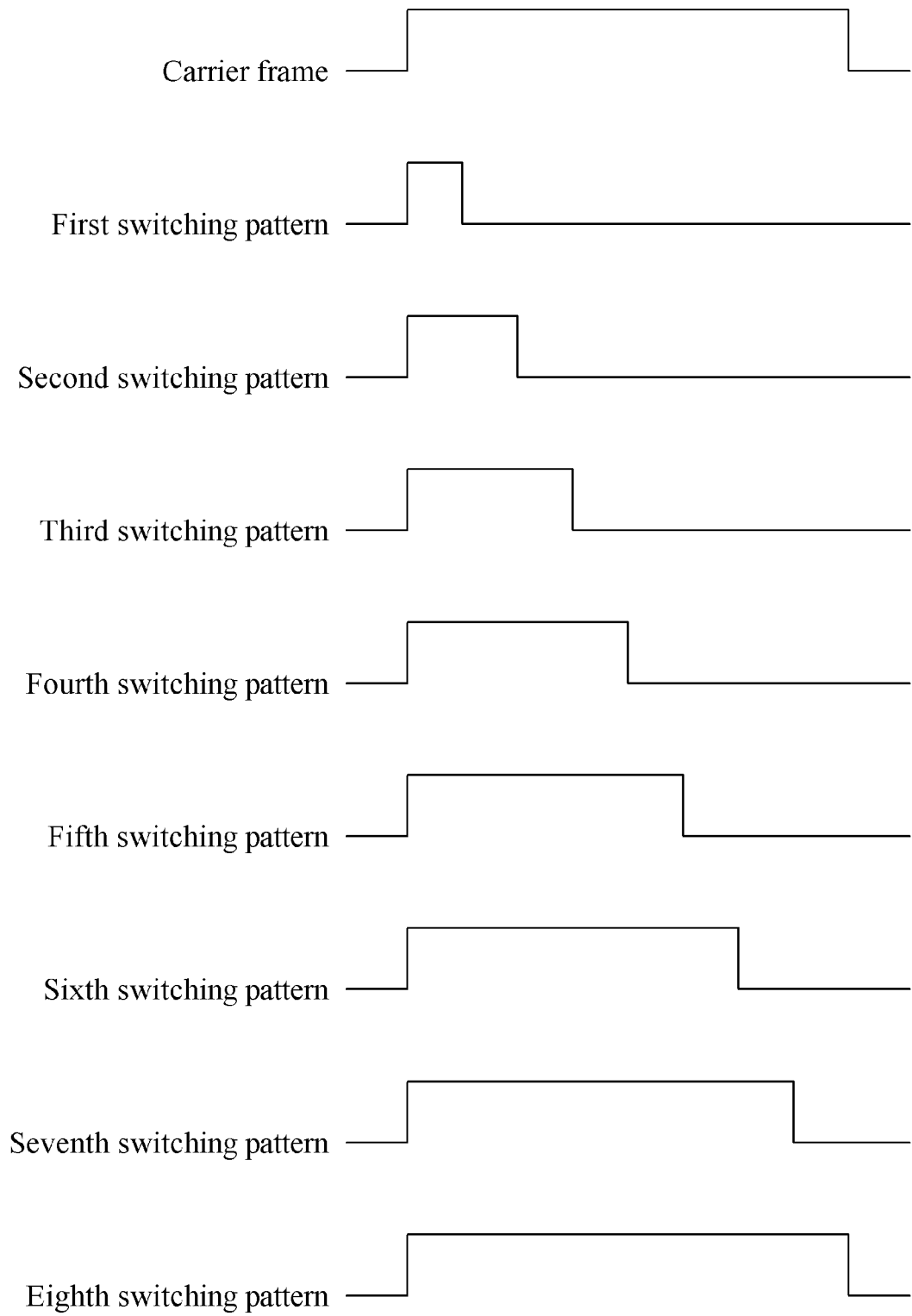
FIG. 5 illustrates an example of describing an operation of a transmission apparatus according to an example embodiment.
Figure 6:
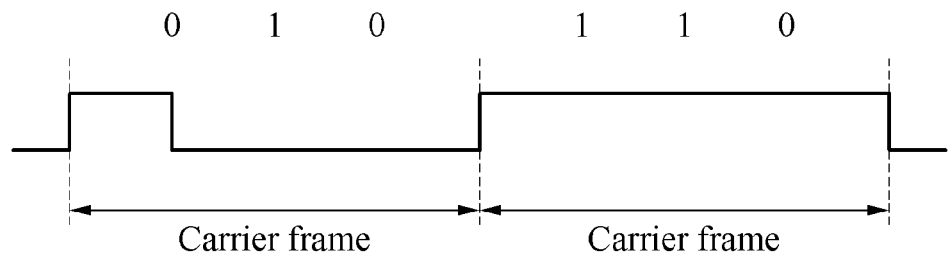
FIG. 6 illustrates an example of describing an operation of a transmission apparatus according to an example embodiment.
Figure 7:
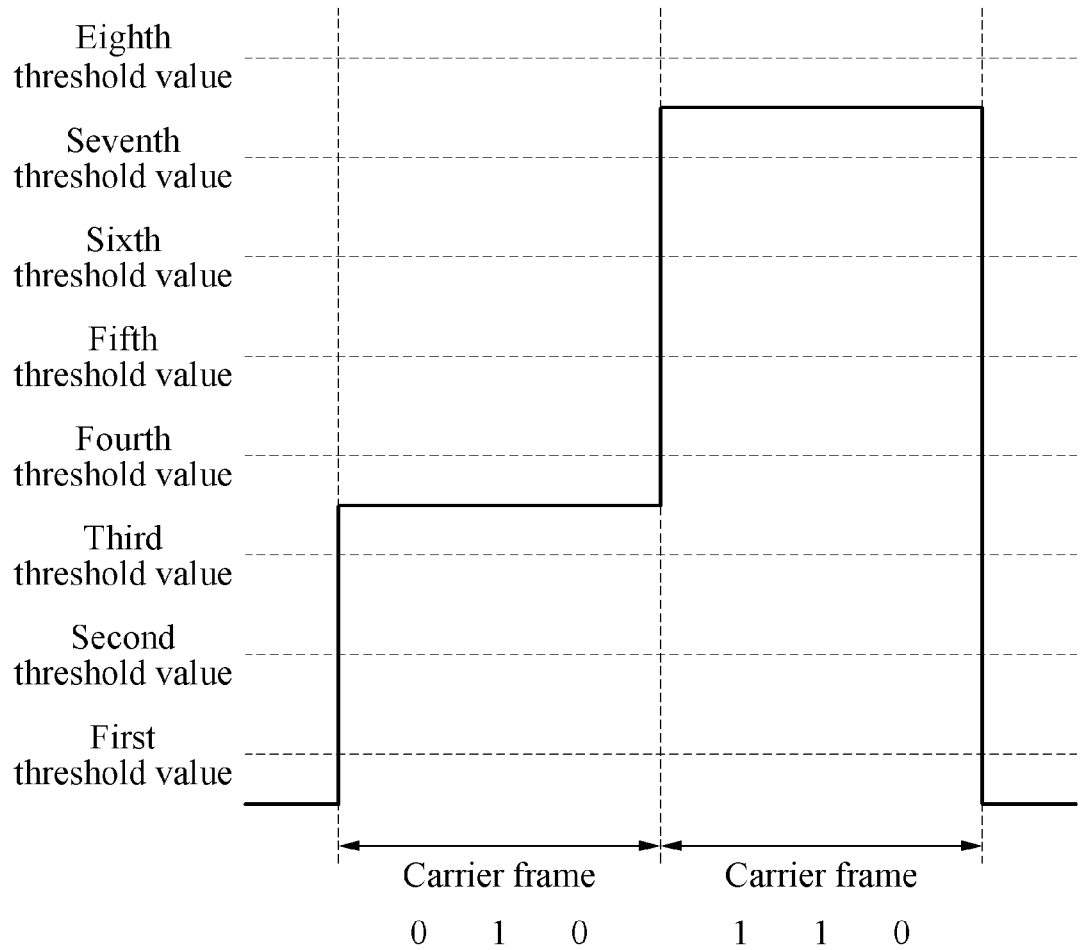
FIG. 7 illustrates an example of describing an operation of a reception apparatus according to an example embodiment.

FIG. 5 illustrates an example of describing an operation of a transmission apparatus according to an example embodiment, FIG. 6 illustrates an example of describing an operation of a transmission apparatus according to an example embodiment, and FIG. 7 illustrates an example of an operation of a reception apparatus according to an example embodiment.

Referring to FIGS. 1A through 1C and FIGS. 5 through 7, the bitset length of the communication system 10 may be 3 bits. The controller 210 may fragment data to be transmitted based on a unit of 3 bits. That is, when the data to be transmitted is $010110_{(2)}$, the controller 210 may generate bitsets including 010 and 110 by fragmenting the data to be transmitted.

The controller 210 may map a plurality of bitsets to a plurality of switching patterns. For example, the controller 210 may map the bitsets including 010 and 110 to the plurality of switching patterns. If the bitset length is 3 bits, the plurality of switching patterns may be provided as shown in FIG. 5.

A total number of the plurality of bitsets may be determined based on the bitset length. For example, the total number of the plurality of bitsets may be $2^n$, and n may be the bitset length. That is, if the bitset length is 3 bits, the total number of the plurality of switching patterns may be 8.

Also, each of the plurality of switching patterns may have a different length. A length of each of the plurality of switching patterns may be determined based on a length of a carrier frame of a background RF signal. For example, the controller 210 may determine the length of each of the plurality of switching patterns according to the above Equation 1.

The controller 210 may perform mapping based on a data size. The controller 210 may map 000 to a first switching pattern, map 001 to a second switching pattern, map 010 to a third switching pattern, map 011 to a fourth switching pattern, map 100 to a fifth switching pattern, map 101 to a sixth switching pattern, map 110 to a seventh switching pattern, and map 111 to an eighth switching pattern.

That is, the controller 210 may transmit the data of $010110_{(2)}$ by controlling the RF switch 220 by sequentially using the third switching pattern and the seventh switching pattern as shown in FIG. 6.

The RF switch 220 may reflect or absorb the background RF signal in response to a control of the controller 210. For example, when the switching pattern is ON, the RF switch 220 may reflect the background RF signal. When the switching pattern is OFF, the RF switch 220 may absorb the background RF signal. That is, the RF switch 220 may adjust a duty ratio based on the switching pattern.

The reception apparatus 300 may receive the background RF signal and decode the background RF signal to acquire the plurality of bitsets. The reception apparatus 300 may include the antenna 310 and the controller 320.

The antenna 310 may receive the background RF signal from the communication apparatus 100 and the transmission apparatus 200.

The controller 320 may perform an average on the background RF signal and acquire an average signal based on a carrier frame unit. Thus, the controller 320 may reduce an error that occurs due to an fluctuation of the background RF signal through averaging.

The controller 320 may acquire an intensity of the average signal and acquire the plurality of bitsets by comparing the intensity of the average signal to a multi-threshold point. A number of multi-threshold points may be determined based on the bitset length of the plurality of bitsets. That is, the transmission apparatus 200 and the reception apparatus 300 may share the bitset length with each other.

For example, the number of multi-bitsets may be $2^n$, and n may be the bitset length. Referring to FIGS. 5 through 7, since the bitset length is 3 bits, the number of multi-threshold points may be 8.

FIG. 7 illustrates an example of a configuration in which the controller 320 acquire the plurality of bitsets from the multi-threshold points.

The controller 320 may perform decoding by comparing the intensity of the average signal to the multi-threshold point based on the carrier frame unit.

The controller 320 may output 000 if the intensity of the average signal is greater than or equal to a first threshold value and less than a second threshold value. The controller 320 may output 001 if the intensity of the average signal is greater than or equal to the second threshold value and less than a third threshold value. The controller 320 may output 010 if the intensity of the average signal is greater than or equal to the third threshold value and less than a fourth threshold value. The controller 320 may output 011 if the intensity of the average signal is greater than or equal to the fourth threshold value and less than a fifth threshold value. The controller 320 may output 100 if the intensity of the average signal is greater than or equal to the fifth threshold value and less than a sixth threshold value. The controller 320 may output 101 if the intensity of the average signal is greater than or equal to the sixth threshold value and less than a seventh threshold value. The controller 320 may output 110 if the intensity of the average signal is greater than or equal to the seventh threshold value and less than an eighth threshold value. The controller 320 may output 111 if the intensity of the average signal is greater than or equal to the eighth threshold value.

Thus, the controller 320 may output $010110_{(2)}$ from the intensity of the average signal as shown in FIG. 7.

For convenience of description, the example embodiments are described in FIGS. 5 through 7 based on an example in which the bitset length is 3 bits, however, not limited thereto and may be performed by variously modifying the bitset length. Also, the example embodiments are described may be performed by variously modifying the total number of the plurality of switching patterns.

Figure 8:
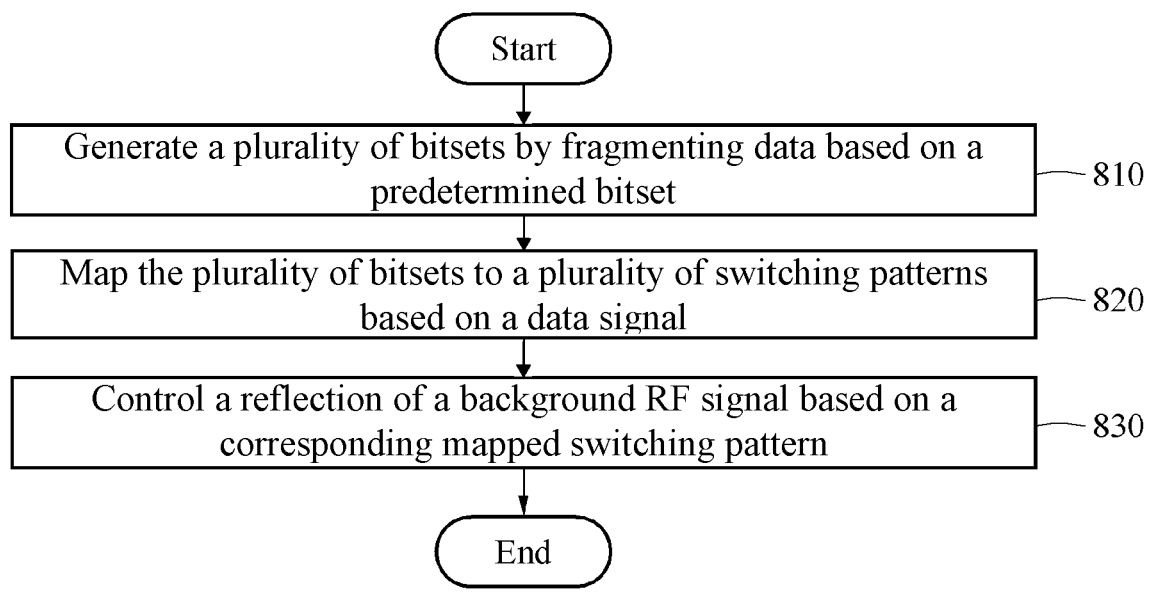
FIG. 8 is a flowchart illustrating a transmission method according to an example embodiment.

FIG. 8 is a flowchart illustrating a transmission method according to an example embodiment.

Referring to FIG. 8, in operation 810, a transmission apparatus may generate a plurality of bitsets by fragmenting data based on a predetermined bitset length.

In operation 820, the transmission apparatus may map the plurality of bitsets to a plurality of switching patterns based on a data size. Here, a total number of the plurality of switching patterns may be determined based on the bitset length. For example, the total number of the plurality of switching patterns may be $2^n$, and n may be the bitset length. Also, each of the plurality of switching patterns may have a different length.

In operation 830, the transmission apparatus may control a reflection of a background RF signal based on a corresponding mapped switching pattern. For example, the transmission apparatus may reflect or absorb the background RF signal using an RF switch. The background RF signal may be configured as a Wi-Fi signal.

Thus, the transmission apparatus may perform transmission by including a plurality of bits in a single carrier frame, thereby increasing a link capacity of an ambient backscatter communication.

Figure 9:
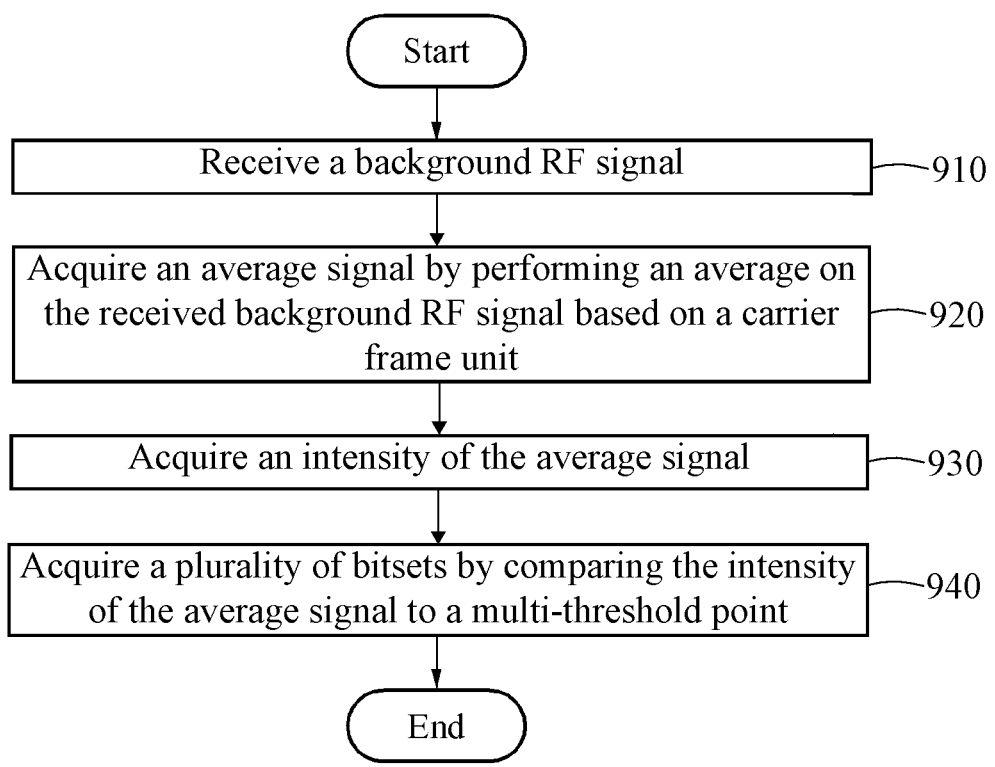
FIG. 9 is a flowchart illustrating a reception method according to an example embodiment.

FIG. 9 is a flowchart illustrating a reception method according to an example embodiment.

Referring to FIG. 9, in operation 910, a reception apparatus may receive a background RF signal. For example, the reception apparatus may receive the background RF signal via an antenna.

In operation 920, the reception apparatus may acquire an average signal by performing an average on the background RF signal based on a carrier frame unit. The reception apparatus may reduce an error that occurs due to an fluctuation of the background RF signal through averaging.

In operation 930, the reception apparatus may acquire an intensity of the average signal.

In operation 940, the reception apparatus may acquire a plurality of bitsets by comparing the intensity of the average signal to a multi-threshold point. Here, a number of multi-threshold points may be $2^n$, and n may be a predetermined bitset length.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like.

Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A transmission method comprising:
   generating a plurality of bitsets by fragmenting data to be transmitted based on a predetermined bitset length;
   mapping the plurality of bitsets to a plurality of switching patterns based on a data size; and
   controlling a reflection of a length of a carrier frame of a background radio frequency (RF) signal based on a corresponding mapped switching pattern,
   wherein a total number of the plurality of switching patterns is determined based on the bitset length, and each of the plurality of switching patterns has a different length.

2. The transmission method of claim 1, wherein the controlling of the reflection comprises reflecting the background RF signal by switching an RF switch based on the corresponding mapped switching pattern.

3. The transmission method of claim 1, wherein the total number of the plurality of switching patterns is $2^n$, and the n is the bitset length.

4. The transmission method of claim 1, wherein the mapping of the plurality of bitsets to the plurality of switching patterns comprises:
   mapping a first bitset among the plurality of bitsets to a first switching pattern; and
   mapping a second bitset among the plurality of bitsets to a second switching pattern,
   wherein each of the first switching pattern and the second switching pattern has a different length.

5. The transmission method of claim 1, wherein a length of each of the plurality of switching patterns is determined according to the following equation:

$$l_k = k * \frac{T}{n}$$

where $l_k$ denotes a length of a $k^{th}$ switching pattern among the plurality of switching patterns, T denotes the length of the carrier frame of the background RF signal, and n denotes the total number of the plurality of switching patterns.

6. A transmission apparatus comprising:
   a controller configured to generate a plurality of bitsets by fragmenting data to be transmitted based on a predetermined bitset length, map the plurality of bitsets to a plurality of switching patterns based on a data size, and control a reflection of a length of a carrier frame of a background radio frequency (RF) signal based on a corresponding mapped switching pattern; and
   an RF switch configured to reflect the length of the carrier frame of the background RF signal under control of the controller,
   wherein a total number of the plurality of switching patterns is determined based on the bitset length, and each of the plurality of switching patterns has a different length.

7. The transmission apparatus of claim 6, wherein the background RF signal is configured as a wireless-fidelity (Wi-Fi) signal.

8. The transmission apparatus of claim 6, wherein the total number of the plurality of switching patterns is $2^n$, and the n is the bitset length.

9. The transmission apparatus of claim 6, wherein the controller is configured to map a first bitset among the plurality of bitsets to a first switching pattern and map a second bitset among the plurality of bitsets to a second switching pattern, and each of the first switching pattern and the second switching pattern has a different length.

10. The transmission apparatus of claim 6, wherein the controller is configured to determine a length of each of the plurality of switching patterns according to the following equation:

$$l_k = k * \frac{T}{n}$$

where $l_k$ denotes a length of a $k^{th}$ switching pattern among the plurality of switching patterns, T denotes the length of the carrier frame of the background RF signal, and n denotes the total number of the plurality of switching patterns.

* * * * *